(No Model.)
G. W. SIMPSON.
CLINICAL THERMOMETER.
No. 455,833. Patented July 14, 1891.
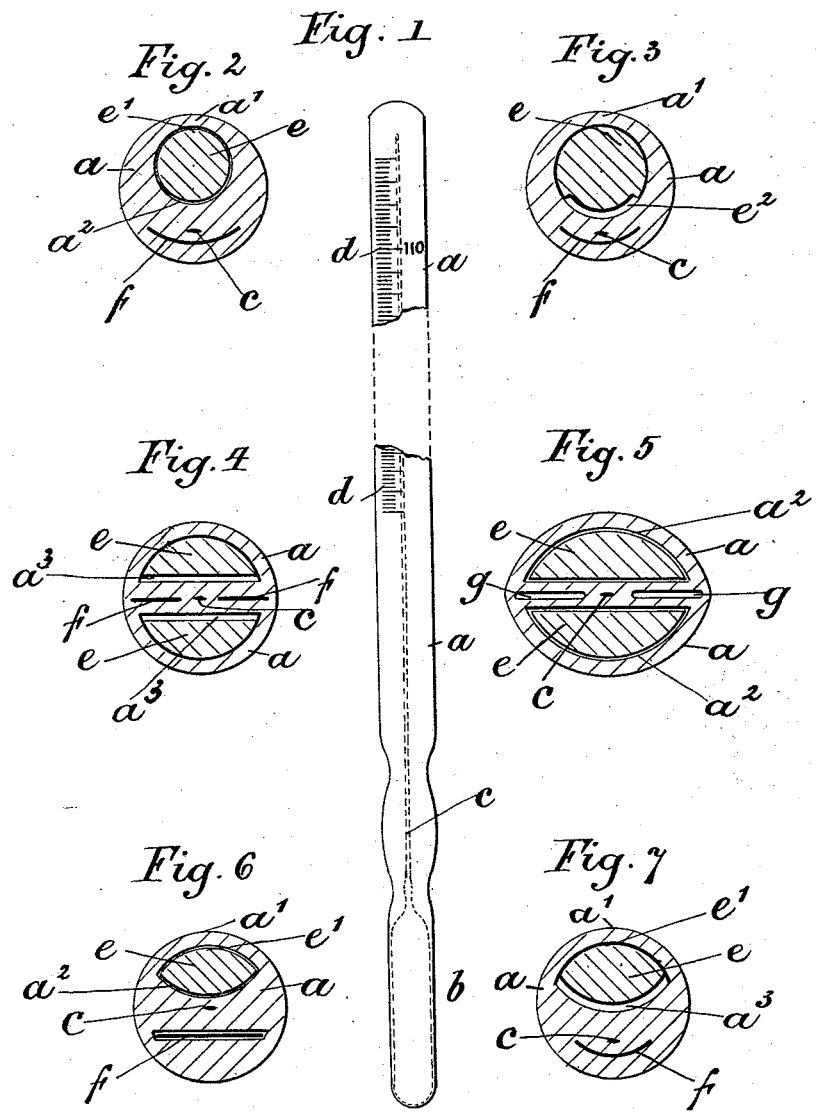
Witnesses.
H. H. Halsted,
E. R. Conner
George William Simpson.
Inventor.
By John J. Halsted & Son
His Attorneys.

UNITED STATES PATENT OFFICE.

GEORGE WILLIAM SIMPSON, OF LONDON, ENGLAND.

CLINICAL THERMOMETER.

SPECIFICATION forming part of Letters Patent No. 455,833, dated July 14, 1891.

Application filed March 21, 1891. Serial No. 385,874. (No model.) Patented in England June 14, 1890, No. 9,250.

*To all whom it may concern:*

Be it known that I, GEORGE WILLIAM SIMPSON, glass-blower, of 19 Cross Street, Hatton Garden, London, in the county of Middlesex, England, a subject of the Queen of Great Britain and Ireland, have invented a new and useful Improvement in Clinical and other Thermometers, (for which a patent was granted to me in Great Britain June 14, 1890, No. 9,250,) of which the following is a specification.

My invention relates to thermometers in which the variation of temperature is indicated relatively to the indications on a fixed scale by the expansion and contraction of a fluid—such as mercury—inclosed in a small bore or channel formed lengthwise of the glass, and wherein such bore is so disposed relatively to a lens formed by the mass of glass making up the body of the thermometer that the apparent size of the indicating-fluid is considerably exaggerated from the real dimensions; and the objects of my improvemement are, first, to dispose the scale of indications below instead of on the surface of the glass, so as to protect them from injury and obliteration by the action of corrosive or other matters; second, to enable the scales to be adjusted to the thermometers after manufacture and seasoning; third, to enable lenses to be employed of greater power and different quality of glass from the body of the thermometer. I attain these objects by the construction of thermometric tubing, indicated by the accompanying drawings, in which—

Figure 1 indicates a thermometer-face, here embodied in the form usually denominated a "clinical thermometer," but any other usual form, size, or description of thermometer-body may be employed. Figs. 2, 3, 4, 5, 6, and 7 show cross-sections of thermometer-tubes of various patterns for various uses with the improvement applied thereto.

In Fig. 1, $a$ is the glass body of the thermometer; $b$, the bulb, here shown elongated; but this form may be of any usual or convenient shape. $c$ is the bore, which varies greatly in dimension in various instruments, but in clinical thermometers is of very minute internal diameter. $d$ indicates a scale, which may be any scale suited to the purpose to which the instrument is designed for use.

In Fig. 2, $a$ is the body of the thermometer in cross-section, $e$ being a lens on which may be engraved at $e'$ the scale to be seen through the thinner part $a'$ of the body $a$. This lens, here shown as of circular cross-section, may be of other form. The lens $e$ is here shown within a correspondingly-shaped cavity $a^2$, left in the body $a$, into which cavity the lens is slid by an opening which may be afterward sealed up. $f$ is a layer or sheet of enamel to throw up the small body of indicating-fluid by contrast of color in the usual way; but this reflecting-sheet may, as will be described, be made removable. When the lens $e$ is drawn out in one with the body in the manufacture of the thermometer-tube, as indicated by Fig. 3, the two parts become fixed and it is necessary for provision to be made for maintaining separation between the two for a portion of the circumference of the lens $e$, and this I insure by forming the recess $e^2$ in the lens $e$ before inserting it in the body $a$, and in the subsequent attenuation of the tube under the glass-blower's hands this space is maintained proportionately. This space $e^2$ also may be utilized to receive a slip of glass engraved as a scale; or the scale may be engraved on the outside of the body $a$ in the ordinary manner.

Fig. 4 indicates the manner of arranging the body $a$ with the mercury or spirit-bore centrally and a lens-cavity and lens $e$ on each side thereof with spaces $a^3 a^3$ when the lenses are "drawn" with the body $a$ in making.

Fig. 5 indicates how the invention is applied when the two lenses $e$ of Fig. 4 are applied after "drawing" the body $a$ by sliding these lenses in, and if the lenses themselves are not "graduated" or marked with "scales" on their faces longitudinal slits to receive scales may be reserved, as shown at $g\ g$, or these spaces may be occupied by enamel.

Fig. 6 shows a variation in the form of lens that may be adopted in place of the circular lens shown in Fig. 2, and this lens $e$ and enamel reflector $f$ are removable.

Fig. 7 indicates the form of lens shown in Fig. 6, but drawn with the "body," and therefore fixed in the space $a^2$, a reserve from this space for air or air and side scales $f$ being provided at $a^3$.

By making thermometers with a hollow space or spaces in addition to the ordinary mercurial or spirit bore, and placing therein a lens either fixed or removable, as set forth, I am enabled to attain greater magnifying power. Another advantage secured is the protection obtained for the scales by their lying within the body of the thermometer and thus defended from the corrosive acid or other matters into which the instrument may be thrust, and further facility is afforded for obtaining enlargement of the indications on the embedded scales as well as of the indicating-column of fluid.

I claim—

1. In a thermometer, a bore for the indicating-fluid formed in a body of glass, in combination with a lens located in a lens-chamber formed for it in the body of the said glass, said lens and lens-chamber being eccentric to the center of the glass body.

2. In a thermometer having an ordinary bore for indicating-fluid, a separate chamber in the same body, and a removable lens within said chamber, said lens and lens-chamber being located eccentric to the center of the body of glass.

3. In a thermometer having an ordinary bore filled with indicating-fluid located centrally of its glass body, the combination therewith of lenses located in lens-chambers, each chamber eccentric to the center of the glass body, substantially as set forth.

In testimony whereof I, the said GEORGE WILLIAM SIMPSON, have hereunto set my hand this 10th day of March, 1891.

GEORGE WILLIAM SIMPSON.

Witnesses:
ALFRED G. BROOKES,
KENNETH ROMANES.